United States Patent [19]

Bartelink

[11] 4,196,317
[45] Apr. 1, 1980

[54] TELEPHONE INTERCOM SYSTEM

[76] Inventor: Everhard H. B. Bartelink, 15 Ridge Rd., Concord, N.H. 03301

[21] Appl. No.: 870,870

[22] Filed: Jan. 20, 1978

[51] Int. Cl.² .................................. H04M 1/72
[52] U.S. Cl. .................................. 179/37; 179/1 H; 179/99 A
[58] Field of Search .................. 179/37–40, 179/99, 1 H, 1 HF, 1 PC, 17 E, 84 T, 84 L, 84 R, 81 B, 100 L, 98, 18 AD

[56] References Cited

U.S. PATENT DOCUMENTS

| | | | |
|---|---|---|---|
| Re. 28,283 | 12/1974 | Cowpland et al. | 179/84 T |
| T947,007 | 6/1976 | Krumreich et al. | 179/1 C |
| 1,994,630 | 3/1935 | Atkins | 179/1 H |
| 2,764,631 | 9/1956 | Heller | 179/1 H |
| 2,764,632 | 9/1956 | Adler | 179/1 H |
| 3,345,466 | 10/1967 | Rahmig | 179/1 H |
| 3,524,931 | 8/1970 | Cartwright et al. | 179/99 |
| 3,629,514 | 12/1971 | Flamini, Jr. | 179/99 |
| 3,985,976 | 10/1976 | Cowpland et al. | 179/81 B |
| 4,016,372 | 4/1977 | Hoehn | 179/99 |

*Primary Examiner*—Gerald Brigance
*Attorney, Agent, or Firm*—Cesari & McKenna

[57] ABSTRACT

Standard four prong, plug-in telephone sets are modified to enable intercommunication among the sets on the subscriber's premises. In a subscriber telephone system including a single central office circuit, only two of the standard four prongs and associated receptacle sockets are used for establishing connection to the central office circuit. In the disclosed system, a local intercom circuit is added to the premises and connects to the remaining two sockets in each receptacle so that each set that is plugged in is also connected to the intercom circuit. The sets are modified to include a line selector switch which enables the talk circuits therein to be switched back and forth between the central office circuit and the intercom circuit. An intercom call signal generator and detector is also added to each set for intercom call signalling over the intercom circuit. In a subscriber telephone system that includes two separate central office circuits, the system is adapted to enable one of the two circuits to be used for intercom calls as well as central office calls. Switching back and forth between an intercom mode and a central office mode on that one circuit is accomplished by a suitable command such as a hook flash. The two central office circuit system also allows the standard four prong plug-in arrangement to be retained for the telephone sets. Calls may also be placed on hold and conference connections made in the two central office system upon the generation of appropriate hook flash commands.

14 Claims, 6 Drawing Figures

TELEPHONE INTERCOM SYSTEM

BACKGROUND OF THE INVENTION

This invention relates generally to telephony and, more particularly, to an improved telephone system for providing both standard telephone service and intercommunication service to telephone subscribers with multiple subscriber sets on extensions.

In many homes and place of business, a multiplicity of subscriber sets, also known as extensions, are coupled to a telephone circuit that connects the subscriber to a telephone company central office or private branch exchange (PBX). Many of these subscribers require, in addition to the standard central office or PBX services provided by the telephone company, intercommunication, or "intercom", services by which communicaton between the different subscriber sets on their premises may be accomplished. Such intercom systems may be used on a strictly local basis to enable conversations between extensions or may be used also to alert other persons that they should join in or take over a conversation which is in progress between one of the extensions and the central office.

Subscriber telephone systems which include intercom circuits as well as one or more central office circuits are currently being furnished by the telephone companies. However, these systems and their auxiliary equipment are generally "wired-in" on a permanent basis at the subscriber location and require a considerable number of auxiliary components and conductors for their interconnection.

Central office subscriber telephone systems are also currently being furnished which are equipped with four-conductor wiring and four-prong plug connectors to permit the connection of subscriber sets in mating receptacles at any of a variety of locations on the premises. With plug-in sets of this type, the subscriber can readily move one or more of his sets to different locations as his needs vary. It would be desirable to provide the same type of plug-in convenience and mobility of sets in systems that inlclude both central office circuits and intercom circuits.

Providing mobility of sets in such systems could be, and is presently being, done by using multiconductor (e.g., 50 pin) connectors of the type commonly used in the telephone industry for semi-permanent installations. However, the handling of these connectors requires fair degree of skill on the part of the subscriber and the installation of multiconductor cables involves a considerable additional investment. To make it practical to provide plug-in operation for sets that provide both central office and intercom services, it is necessary to provide a system that requires a minimum of conductors and that permits the use of line cords equipped with simple, rugged, preferably standard four-prong plugs that are easy to insert and remove.

Accordingly, it is a broad subject of this invention to provide an improved telephone intercom system.

Another object of the invention is to provide an improved system for providing combined telephone and intercommunication services to telephone subscribers with multiple subscriber sets.

Another object of the invention is to provide an improved system for augmenting a standard, multiple subscriber set telephone system to enable intercommunication between the various subscriber sets.

Another object of the invention is to provide a system of the type described that requires a minimum number of conductors and a minimum number of additional components to enable the augmented service.

Another object of the invention is to provide a system of the type described that can be used with standard four-prong, plug-in subscriber sets which are relatively inexpensive, easy to handle and easy to move to different locations on the subscriber's premises as the need arises.

Still another object of the invention is to provide a system of the type described that can also be used with subscriber telephone systems having two or more separate central office or PBX lines.

SUMMARY OF THE INVENTION

In accordance with the present invention, subscriber telephone sets are modified for intercom use by incorporating therein an additional call detector and a call signal generator that are used for intercom purposes. The intercom call detector is illustratively in the form of a loudspeaker, while the intercom call signal generator is illustratively in the form of an oscillator which can be activated to produce an audio frequency signal that is used for signalling other sets to answer an intercom call. A switch is also included in the subscriber set which enables the standard talk circuits in the set to be switched from the conventional central office circuit to an intercom circuit when communication with another local set is desired. The sets used in the system are otherwise of standard construction, preferably of the four-prong connector plug-in type commonly used to provide mobility of sets on the subscriber's premises.

Intercom services are provided in a conventional, four socket receptacle, single central office circuit subscriber telephone system by adding an additional two conductor circuit that interconnects each receptacle and that is used for intercom purposes. A D.C. power supply is also included at the subscriber's premises to provide power to, and enable communication over, the intercom circuit. The conventional two conductor central office circuit is connected in the normal manner to two of the four sockets in each receptacle. Normally, the remaining two sockets are used in systems of this type to provide power to a dial light in each subscriber set. However, in the present system, the two conductor intercom circuit is connected to the remaining two sockets in each receptacle so as to enable intercommunication among the local sets. The modified plug-in sets may then be inserted into the various receptacles and used either for conventional telephone calls over the central office circuit or for communicating with other sets over the local intercom circuit.

A system is also described which is adapted to enable intercommunication among modified plug-in subscriber sets in a conventional, four socket receptacle, subscriber telephone system that includes two separate central office circuits. In this latter system, one of the two central office circuits is used conventionally, while the other central office circuit is used both for central office calls and for intercom calls. Special switching and timing control units are included at the subscriber's premises which enable the subscriber, upon command, to place and receive central office calls in the normal manner, place central office calls on hold, to switch back and forth between the two central office circuits, to place and receive intercom calls, and to generate conference, or multiple party, calls. The control units are illustratively adapted to respond to commands in the form of hook switch flashes for these purposes.

BRIEF DESCRIPTION OF THE DRAWING

The foregoing and other features and advantages of the invention will be better understood from the following detailed description taken in conjunction with the accompanying drawing in which.

DETAILED DESCRIPTION OF ILLUSTRATIVE EMBODIMENTS

Figure 1:
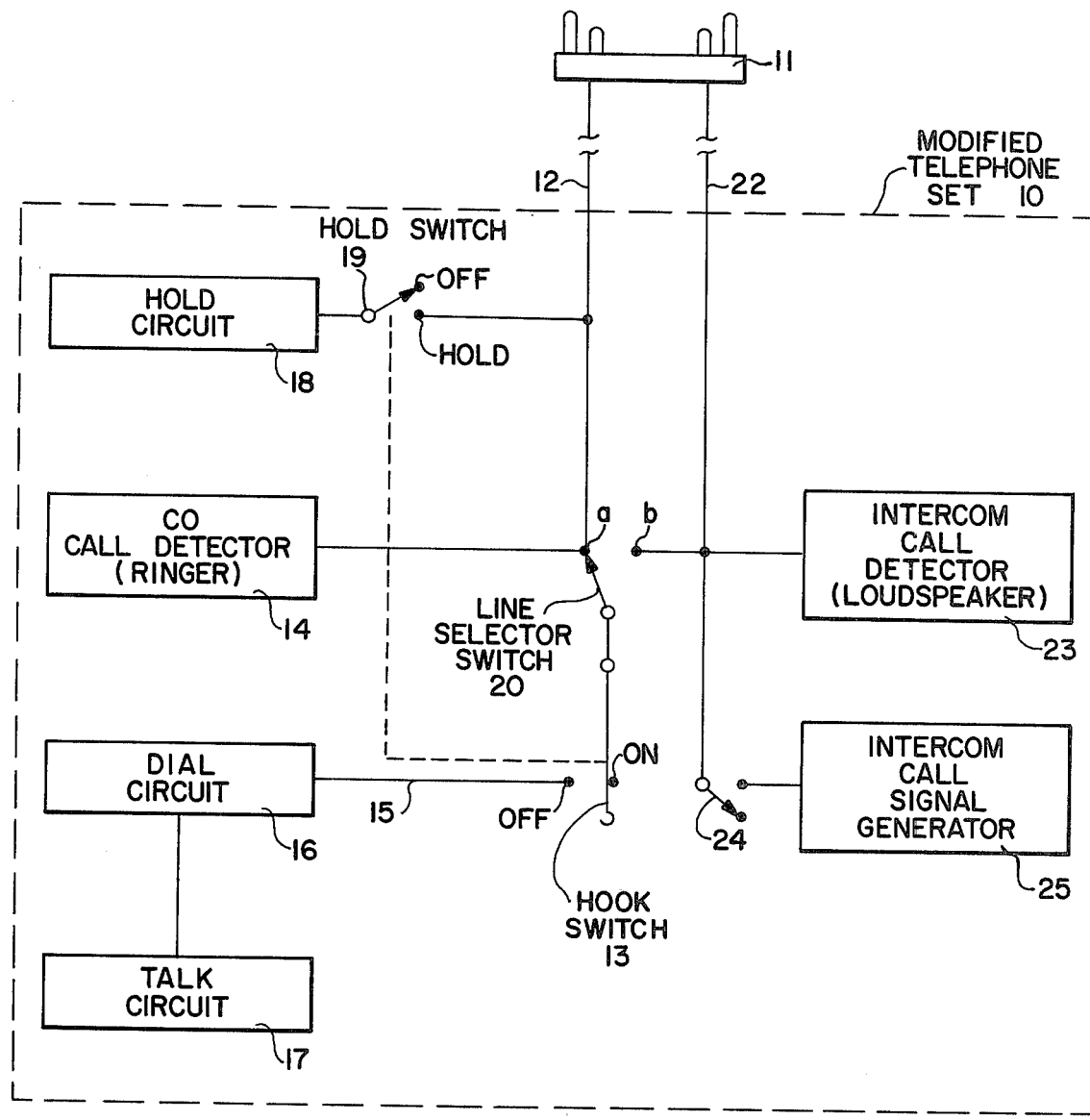
FIG. 1 is a generalized block diagram of a plug-in subscriber telephone set which has been modified in accordance with the invention to provide intercom services.

Referring now to FIG. 1 of the drawing, there is shown a telephone set 10 which has been modified in accordance with the invention for making and receiving intercom calls. Most of the components of the set 10 are standard. For example, the set 10 includes a conventional four prong plug 11 adapted to be removably inserted within a mating four socket telephone receptacle (not shown). A line 12 connects two of the four prongs in the plug 11 (e.g., the left two prongs in FIG. 1) to circuitry within the set 10. The line 12 is shown as a single line in FIG. 1 for ease of illustration, but is actually comprised of two separate conductors. The line 12 is used to carry conventional central office call signals between the set 10 and a telephone central office circuit.

Within a standard telephone set, the line 12 connects directly to a hook switch 13 which, as is known, is normally in an "on" position and which is moved to an "off" position when the telephone handset is lifted. The line 12 also connects to a central office call detector 14 which is typically in the form of a ringer. When an incoming call is received on the line 12 from the telephone company central office, the detector 14 generates an audible ring to alert the subscriber of the call.

When the telephone handset is lifted and the hook switch 13 is thereby moved to its "off" position, the line 12 is connected by a line 15 to a dial circuit 16 and a talk circuit 17. Thus, when the telephone handset is lifted, the subscriber may answer an incoming call and communicate over the line 12 with a remote calling party using the talk circuit 17. Alternatively, the subscriber may lift the handset to place a call to the central office over the line 12 using the dial circuit 16 and may communicate with a remote called party to which he has been connected by the central office using the talk circuit 17.

The set 10 may also be provided with a hold circuit 18 that is actuated by a hold switch 19. By moving the hold switch 19 to its "hold" position, the subscriber may place a call on the line 12 in a "hold" condition. As indicated in FIG. 1, the switch 19 is typically mechanically interlocked to the hook switch 13 so that when the handset is placed "on-hook", the hold switch 19 returns to its "off" position.

The foregoing components of the set 10 are standard and may be found in most telephone sets now furnished by the telephone companies. The set 10 is, however, modified in accordance with the invention for use in communicating between two or more of the sets 10 on the subscriber's premises.

Specifically, a line selector switch 20 is added to the set 10 between the line 12 and the the hook switch 13. The switch 20 includes an "a" terminal which is connected to the line 12 and a "b" terminal. When the switch 20 is in its "a" position, the connection within the set 10 is standard and the set 10 may be used in its normal fashion to place and receive central office calls.

As indicated in FIG. 1, a second line 22 extends from the plug 11 into the set 10. The line 22, which is also actually two conductors, is connected to the two remaining prongs in the plug 11 (e.g., the right pair of prongs) and is typically used in standard sets to provide power to a light that illuminates the dial mechanism in the set. In accordance with the invention, however, the line 22 is disconnected from the dial light within the set 10 and connected to the "b" terminal of the line selector switch 20. An intercom call detector 23 is added to the set 10 and connected to the line 22. Also added are an intercom signalling switch 24 and an intercom call signal generator 25. The intercom call signal generator 25 connects through the switch 24 to the line 22.

The intercom call signal generator 25, which illustratively includes an oscillator for producing an audio frequency signal, may be actuated by the closing of the switch 24 to send the signal over the line 22. As will be appreciated more fully below from the discussion of FIG. 2, the lines 22 in each modified set 10 on the subscriber's premises are interconnected by a local intercom circuit. The intercom signal that is generated by the closing of the switch 24 may thus be transmitted over the local intercom circuit to the other modified sets 10 on the premises. The intercom call detector 23 in each set 10 illustratively includes a loudspeaker which reproduces the intercom signal in the form of an audible tone. A user near one of the sets 10, upon hearing the tone, recognizes that another user desires to establish an intercom call. To answer the intercom call, the user hearing the tone moves the line selector switch 20 in his set 10 to the "b" position to connect the talk circuit 17 in the set to the line 22 and lifts his handset. The calling user moves the switch 20 in his set 10 to the "b" position also to connect his talk circuit 17 to his line 22. Intercommunication between the sets 10 thus becomes possible using the standard talk circuits 17 in each set 10.

Figure 2:
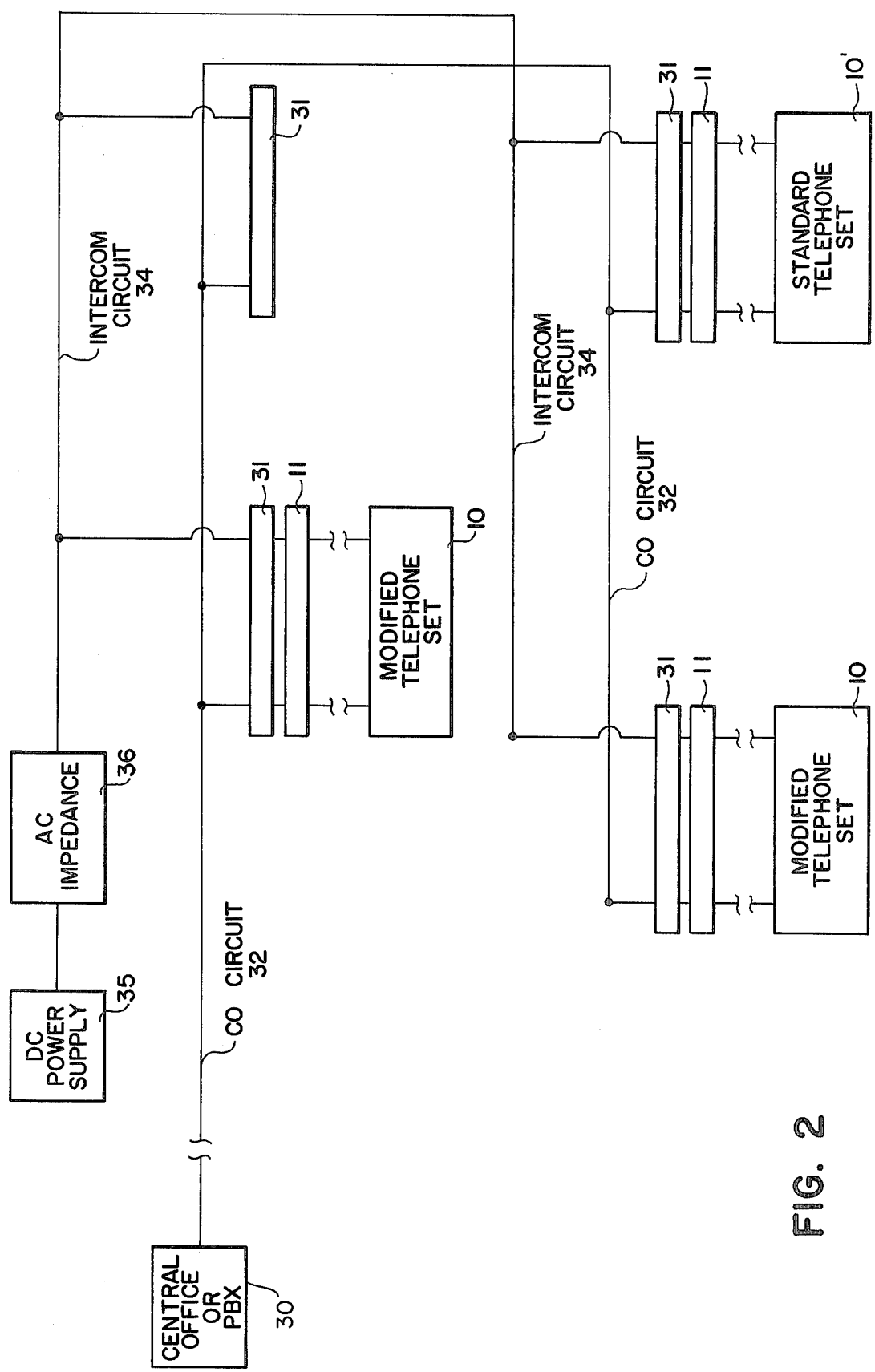
FIG. 2 illustrates a single central office circuit subscriber telephone system in which the modified subscriber set of FIG. 1 is used to provide intercom services.

FIG. 2 illustrates the use of the modified telephone sets 10 in a single central office circuit subscriber telephone system. The system is shown as including four, standard four socket telephone receptacles 31 distributed about the subscriber's premises. A central office telephone circuit 32 extends from a telephone company central office or private branch exchange (PBX) 30 to the subscriber's premises and connects in the conventional manner to two of the four sockets in each receptacle 31. Telephone calls to and from the central office 32 are made over the circuit 32. Although not shown as such, the central office circuit 32 is also a two conductor circuit. The plugs 11 of the modified sets 10 are inserted in two or more of the receptacles 31. As indicated in FIG. 2, one or more of the receptacles 31 may be left unused, and one or more of the receptacles 31 may receive a standard telephone set 10′ which is usable for central office calls but not usable for intercom call purposes.

In order to enable intercommunication between the modified sets 10, a two conductor intercom circuit 34 is added to the system to interconnect each of the receptacles 31. The intercom circuit 34 connects to the remaining two of the four sockets in each of the receptacles 31. Also added are a DC power supply 35 and an AC impedance 36 which is capable of transmitting DC currents. The power supply 35 provides DC power to the intercom circuit 34 through the AC impedance 36. The AC impedance 36 is included because most conventional DC power supplies, whether rectifiers or batteries, have a very low internal impedance and would, therefore, constitute an AC short on the intercom circuit 34 and destroy its ability to transmit signals between the modified subscriber sets 10. Both the power supply 35 and impedance 36 may be permanently mounted at a convenient location on the subscriber's premises.

When an intercom call signal is sent over the intercom circuit 34 by actuation of the intercom call signal generator 25 (FIG. 1) in one of the modified sets 10, the signal causes the intercom call detectors 23 in all other modified sets 10 connected to the circuit 34 to operate. If more than two modified sets 10 are included in the system, coded intercom call signals may be used to distinguish the sets 10 or different users on the premises for intercom calling purposes. For example, a first set 10 or a first user may be identified by a single intercom call signal tone burst, a second set 10 or a second user by two separate such bursts spaced apart in time, a third by three such bursts, and so on. As indicated above in connection with FIG. 1, the sets 10 may be switched back and forth between the central office circuit 32 and the intercom circuit 34 simply by actuation of the line selector switch 20.

If one of the users using one of the sets 10 in the system of FIG. 2 is talking on the CO circuit 32 and desires to hold the call so that he can use the intercom circuit 34 either to place or receive an intercom call, the user should operate the hold switch 19 (FIG. 1) in his set 10 before switching the switch 20 to the "b" position. The intercom circuit 34 may be used in this manner by a first user to instruct a second user on the premises to use his set 10 to join in the CO circuit call. To accomplish this, the second user, after receiving the intercom call, switches the switch 20 in his set 10 back to the "a" position to connect to the CO circuit 32, and the first user switches the switch 20 in his set 10 back to the "a" position. The first user may, but need not, reset the hold switch 19 in his set to its "off" position.

Thus, with a relatively simple modification to the telephone sets 10 used on the subscriber's premises and with the addition of a suitably powered interconnecting intercom circuit 34, the subscriber's system may be used for intercom calls as well as central office calls. The sets 10, however, retain their relative simplicity, ease of use and mobility because the standard four prong plugs 11 can still be used.

Figures 3, 4:
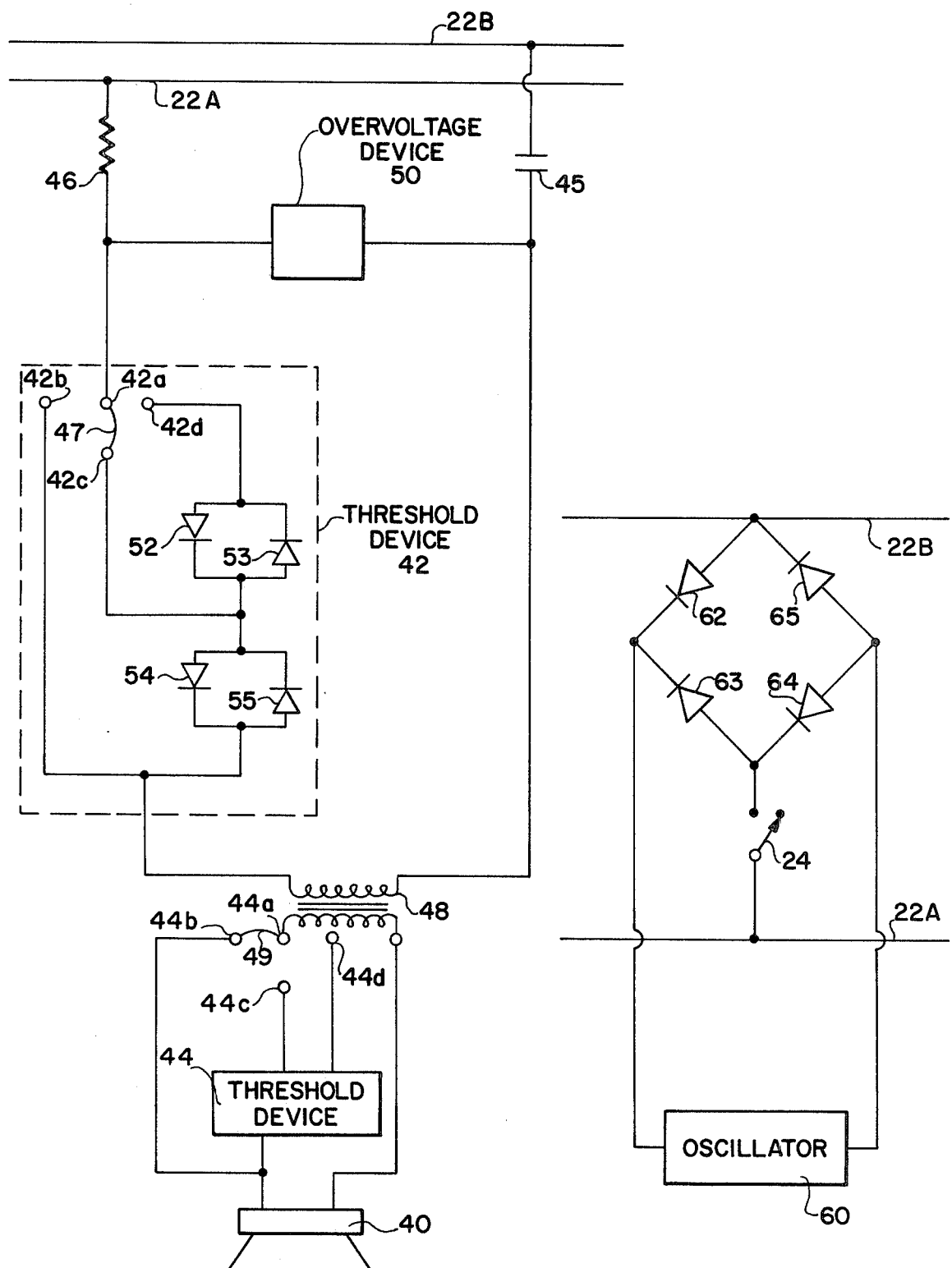
FIG. 3 illustrates in greater detail an intercom call detector that is used in the modified subscriber set of FIG. 1 and a preferred manner of connecting the detector to an intercom circuit.
FIG. 4 illustrates in greater detail an intercom call signal generator that is used in the modified subscriber set of FIG. 1 and a preferred manner of connecting the generator to an intercom circuit.

FIG. 3 illustrates further details of a preferred form of the intercom call detector 23 which is included in each modified telephone set 10. As previously noted, the detector 23 preferably includes a loudspeaker which is shown schematically at 40 in FIG. 3. Both conductors of the line 22 extending from the plug 11 of FIG. 1 are also shown in FIG. 3 as conductor 22A and conductor 22B, respectively.

It is possible that voice signals that occur on the intercom circuit 34 during an intercom call may be reproduced by the loudspeaker 40 in each modified set 10 at an observable level. In general, it is desirable to avoid such a condition. The reason for this does not lie in considerations of privacy or security, because any person who is near a modified set 10 could easily lift the handset, switch the line selector switch 20 to the "b" position, and monitor the communication over the intercom circuit 34. The main reason for wanting to reduce or suppress the transmission of voice signals through the loudspeaker 40 is to avoid disturbing other users who have modified sets 10 near them, but who are not involved in the intercom call.

The circuitry of FIG. 3 is adapted to reduce or eliminate the transmission of disturbing voice signals through the loudspeaker 40. As a starting point, the intercom call signal generator 25 in each modified set 10 is arranged so that it transmits the intercom call signal at a level that is substantially higher than the average level of the voice signals that appear on the intercom circuit 34. A suitable threshold device interposed between the conductors 22A and 22B and the loudspeaker 40 may then be used selectively to attenuate signals in the relatively low level range normally occupied by voice signals and to pass the higher level intercom call signal.

More specifically, in FIG. 3, the conductors 22A and 22B are connected through a series condensor 45 and a series resistor 46 to a transformer 48 which energizes the loudspeaker 40. To protect the loudspeaker 40 from overloads which might be caused by spurious voltages on the conductors 22A and 22B, an overvoltage device 50 is placed across the primary winding of the transformer 48. The overvoltage device 50 may be of conventional construction. A suitable device 50, for example, comprises a pair of semiconductive components that "breakdown" under an overvoltage. One of the components is typically arranged to protect against overvoltages of one polarity, while the other of the components is arranged to protect against overvoltages of the opposite polarity.

A threshold device 42 is interposed between the resistor 46 and the primary winding of the transformer 48. The device 42 includes one or more pairs of parallel, oppositely polarized diodes 52–53 and 54–55 which are selected to provide the wanted attenuation of low level signals. The device 42 is also illustratively provided with optional connection means which allow the subscriber to select the amount of attenuation provided by the device 42. These means comprise terminals 42a, 42b, 42c and 42d. Terminals 42a and 42c are shown interconnected in FIG. 3 by an option strap 47. Thus, only a single pair of diodes (e.g., diodes 54–55) are being used in FIG. 3 and an intermediate level of attenuation is being provided by the device 42. If terminals 42a and 42b were interconnected, both of the diode pairs in the device 42 would be by-passed to provide no attenuation, whereas if terminals 42a and 42d were interconnected, the two diode pairs would be connected in series to provide greater attenuation than that of the single diode pair. The particular connection that is used in the device 42 depends upon the level of voice signal transmission through the loudspeaker 40 that can be tolerated.

A similar threshold device 44 and similar optional connection means therefor comprising terminals 44a, 44b, 44c and 44d may be provided on the secondary winding of the transformer 48. In FIG. 3, the device 44 is shown being by-passed by option strap 49. Whether attenuation is necessary only on the primary side of the transformer 48, only on the secondary side of the transformer 48, or on both sides thereof, depends upon the subjective desires of the subscriber and the specific impedance levels and voice signal levels on the intercom circuit 34. In any event, the circuitry of FIG. 3 is capable of providing the subscriber with some degree of control over the level of the voice signals that pass through the loudspeaker 40.

Studies indicate that average level of voice signals transmitted into a telephone handset correspond to about −12 dbm or about 0.195 volts in a 600 ohm circuit. Peak magnitudes in the voice signals are generally considered to be about 10 db higher than average magnitudes, thus corresponding to a level of about −2 dbm or about 0.615 volts in a 600 ohm circuit. The probability that these peak magnitudes occur is considered to be about 0.03 so that the voice signals will fall below this level for 97 percent of the time.

It is assumed that the intercom call signal generator 25 in each modified set 10 transmits the intercom call signal at a level that is about 32 db above the average voice signal. This places the intercom call signal at a level of about +20 dbm or about 7.75 volts in a 600 ohm circuit. For a single pair of diodes in the threshold device 42 of FIG. 3, the extra attenuation at the −12 dbm level of the average voice signal is about 18.5 db, thus bringing the level difference between the intercom call signal and the average voice signal at loudspeaker 40 to about 50 db, which is generally deemed to be sufficient for practical purposes. During peak magnitudes in the voice signals (e.g., −2 dbm), the attenuation of the single diode pair is reduced to about 5 db, resulting in a level difference of about 37 db between the two signals. This latter condition occurs only about 3 percent of the time, which should be acceptable.

Using both diode pairs in the device 42 of FIG. 3, the attenuation at the −12 dbm level is about 51.5 db, resulting in a level difference at the loudspeaker 40 of about 84 db, which is considered to be excellent. At the peak −2 dbm level, the attenuation is about 11 db resulting in a 44 db level difference for about 3 percent of the time, which is considered good. It should be noted that additional diode pair stages may be added to the threshold devices 42 and 44 if even greater degrees of attenuation of voice signal at the loudspeaker 40 is desired.

FIG. 4 illustrates further details of the intercom call signal generator 25 that is included in each modified set 10 and a preferred manner of connecting the generator 25 to the line 22. As in FIG. 3, the two conductors of the line 22 are shown in FIG. 4 as conductors 22A and 22B. The generator 25 comprises an oscillator 60 for producing the audio frequency intercom signal. The oscillator 60 may be a conventional two conductor type that is actuated by the closing of the switch 24 and that thereupon superimposes an AC voltage on the DC circuit.

A diode bridge comprising diodes 62, 63, 64 and 65 is preferably inserted between the switch 24 and the conductor 22B. This bridge insures that the oscillator 60 will operate regardless of the polarity of the DC voltage between the conductors 22A and 22B. Thus, even if the wiring of the intercom circuit 34 (FIG. 2) or of the conductors 22A and 22B had been inadvertently reversed upon installation, the oscillator 60 will still operate properly.

Figure 5:
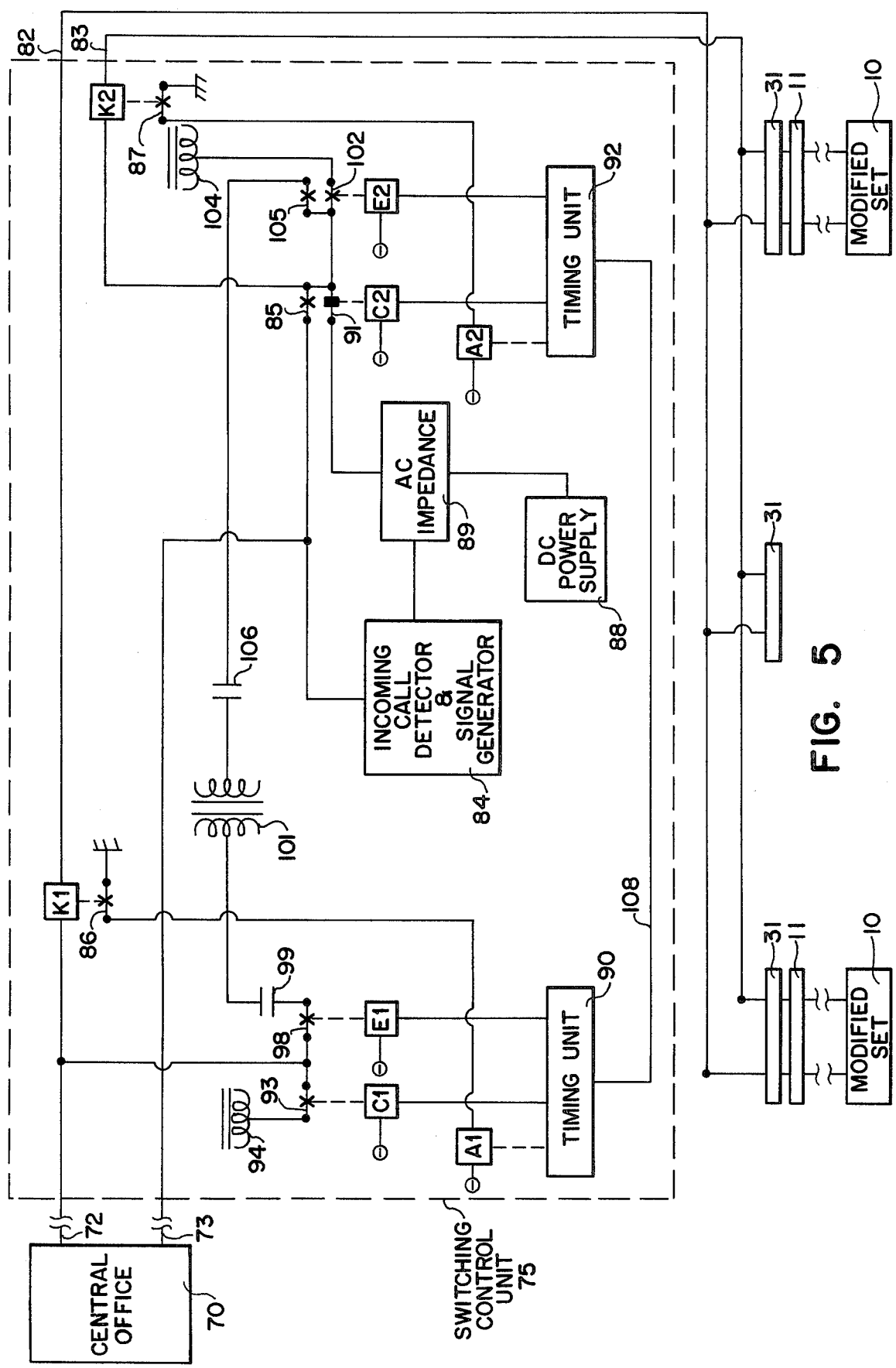
FIG. 5 illustrates a subscriber telephone system that includes two separate central office lines and that has been modified to permit use of the modified subscriber set of FIG. 1 for intercom purposes.

FIG. 5 of the drawing illustrates a switching control unit 75 embodied in accordance with the invention which is adapted to provide intercom services in a subscriber telephone system that includes two separate central office circuits. As indicated in FIG. 5, central office circuits 72 and 73 extend from a central office 70 into the switching control unit 75 which is located at the subscriber's premises. A corresponding pair of circuits 82 and 83, respectively, extend out of the control unit 75 and connect to each of a plurality of four socket, telephone receptacles 31 distributed about the subscriber's premises. The plugs 11 of the modified telephone sets 10 of FIG. 1 are inserted in two or more of the receptacles 31.

Generally, the switching control unit 75 is adapted to enable users on the subscriber's premises to use both of the central office circuits 72 and 73 and corresponding subscriber circuits 82 and 83 in the normal manner to place and receive calls to and from the central office 70. The control unit 75 is also adapted to enable users who have access to the modified sets 10 to use the subscriber circuit 83 for intercom call purposes. Thus, the subscriber circuit 83 is used both for central office calls and for intercom calls.

The dial and talk circuits 16 and 17 in the modified sets 10 may be switched back and forth between the circuits 82 and 83 by moving the line selector switch 20 of FIG. 1 back and forth between the "a" and "b" position, respectively. As appreciated from FIG. 1, the call detector 14 in the sets 10 will be permanently connected through the line 12 to the circuit 82, while the call detector 23 in the sets 10 will be permanently connected through the line 22 to the circuit 83. Incoming calls on the CO circuit 72 and corresponding subscriber circuit 82 thus actuate the call detectors 14 in the normal manner to produce an alerting ring at the sets 10.

The switching unit 75 is adapted to sense when an incoming call is received on the other CO circuit 73 and to generate a signal corresponding in characteristics to the intercom calling signal that is transmitted over the associated subscriber circuit 83 and corresponding in timing to an incoming ring signal. This simulated ring signal actuates the call detector 23 in the sets 10 to alert users that an incoming call has been received on the CO circuit 73. As above, the intercom call signal generator 25 (FIG. 1) in each set 10 can be used to generate an audio frequency signal that is transmitted over the subscriber circuit 83 to alert other users on the premises that an intercom call is desired. Preferably, the timing characteristics (e.g., frequency, duty cycle, etc.) of the intercom call signal transmitted over the circuit 83 are different from those of the simulated ring signal generated by the unit 75 so that users may readily distinguish between incoming calls and intercom calls on the circuit 83.

The switching control unit 75 is also illustratively adapted to respond to suitable commands generated by the users at the sets 10, such as flashes, or momentary depressions, of the hook switch 13 (FIG. 1) to perform various switching operations. These switching operations including switching the subscriber circuit 83 from an intercom mode to a central office mode, switching central office calls on either circuit 82 or 83 to a hold condition, and preparing the circuits 82 and 83 for a conference call in which both circuits 82 and 83 are involved.

The operation of the switching control unit 75 will now be described in greater detail by specific reference to FIG. 5. As appreciated from FIG. 5, a schematic notation generally known in the field as "detached contact" is used for the various relays shown therein. According to this notation, an "X" shown intersecting a conductor represents a normally open, or make, contact of a relay, and a bar shown intersecting a conductor at right angles represents a normally closed, or break, contact of a relay, where "normally" refers to the unenergized condition of the relay.

In FIG. 5, the CO circuit 72 enters the switching control unit 75 where it passes through a current sensing relay K1. From the relay K1, the circuit 72 extends out of the unit 75 as the subscriber circuit 82. The CO circuit 73 enters the unit 75 and connects therein to an incoming call detector and ring signal generator 84. The circuit 73 also can be extended through make contact 85 of a relay C2 to a second current sensing relay K2. From the relay K2, the circuit 73 extends out of the unit 75 as the subscriber circuit 83.

The relays K1 and K2 are used to sense off hook conditions in sets 10 on the circuits 82 and 83, respectively, and hook flash commands generated at the sets 10 and transmitted over the circuits 82 and 83, respectively. The K1 relay, for example, is energized when one of the sets 10 connected to the circuit 82 goes off hook and de-energized when the set 10 goes back on hook, even if only for a short period of time (e.g., about 0.5 seconds) as in the case of a hook flash. The relay K2 operates similarly for sets 10 connected to the circuit 83. When energized, the relays K1 and K2 close their respective make contacts 86 and 87. Preferably, the relays K1 and K2 are of the high sensitivity type. To good advantage, each relay K1 and K2 may comprise an optical isolator that is inserted in a rectifier bridge to make it independent of current polarity. To provide low impedance to voice signals, each isolator may also be bridged by a condensor (not shown).

Also included in the unit 75 are a DC power supply 88 and AC impedance 89 that are illustratively identical to the corresponding components 35 and 36, respectively, in FIG. 2. The output of the AC impedance 89 extends through break contact 91 of the relay C2 to the relay K2 and thence to the circuit 82. The DC power supply 88 and AC impedance 89 are thus normally connected to the circuit 83 to power the circuit for intercom call purposes.

An incoming call signal from the central office 70 on the circuit 72 passes through the relay K1 to the circuit 82 and actuates the call detectors 14 in each set 10. To answer the incoming call on the circuit 72, a user need only be sure that the line selector switch 20 in his set 10 is in the "a" position and lift his handset. When the hand set is lifted, the relay K1 is energized and through its make contact 86, energizes relay A1. The relay A1, in turn, activates a timing unit 90, the purpose of which will be described more fully below. The user may then communicate with the calling party. When the call is completed, the user replaces his handset and the relays K1 and A1 are de-energized to deactivate the timing unit 90 and return the circuit 72 to an idle condition.

To place an outgoing call on the circuit 72, the user need only be sure that the switch 20 in his set 10 is in the "a" position and lift his handset. The relays K1 and A1 operate as above and the user can proceed to dial the desired number using the dial circuit 16 (FIG. 1) in his set 10. When the outgoing call is completed, the user replaces his handset, and thereby de-energizes the relays K1 and A1 and returns the circuit 72 to an idle condition.

Because the relay C2 is normally unenergized, the circuit 83 is normally disconnected from the CO circuit 73 by make contact 85 and normally connected to the AC impedance 89 and DC power supply 88 by break contact 91. Thus, the circuit 83 is normally in an intercom mode. Any user may thus move the switch 20 in his set 10 to the "b" position and use the circuit 83 in the manner described earlier to place or receive intercom calls over the circuit 83. As described above in connection with the relays K1 and A1, the relays K2 and A2 will be energized whenever one or more of the sets 10 on the circuit 83 are off hook for intercom call purposes. The relay A2, when energized, also activates a timing unit 92 which is described more fully below. When all sets 10 on the circuit 83 are replaced on hook after completion of the intercom call, the circuit 83 is returned to an idle condition.

If an incoming call signal from the central office 70 is received on CO circuit 73, that signal activates call detector and signal generator 84 to produce the simulated ring signal. The ring signal is coupled through the AC impedence 89, the break contact 91 of relay C2, the relay K2 to the circuit 83. The call detectors 23 in each set 10 thus produce an audible indication of the incoming call. To answer the call, a user moves the switch 20 in his set 10 to the "b" position and lifts his handset. This energizes relays K2 and A2 and activates timing unit 92. The user then generates one hook flash. Relays K2 and A2 are de-energized for the duration of the hook flash and the de-energization of the relay A2 is sensed by the activated timing unit 92 which, in turn, energizes relay C2. Relay C2, through its break contact 91 and make contact 85, disconnects the circuit 83 from the AC impedance 89 and connects it directly to the circuit 73. The incoming central office call on the circuit 73 is thus connected to the answering user's set 10 so that he may receive the call. Upon completion of the call, the user replaces his handset, the relays K2 and A2 are de-energized, and the timing unit 92 de-energizes the relay C2 to return the circuit 73 to an idle condition.

To place an outgoing call on the circuit 73, the procedure is similar. The user switches the switch 20 in his set 10 to the "b" position and lifts his handset. Relays K2 and A2 are energized and the timing unit 92 is activated. The user generates one hook flash which is sensed by the timing unit 92 to energize relay C2. Relay C2, through its make contact 85, connects the circuit 83 to the circuit 73 to enable the user to dial and complete the outgoing call. The timing unit 92 is adapted to keep the relay C2 energized until all sets 10 on the circuit 83 are returned to an on hook condition.

As previously noted, the switching control unit 75 is also capable of holding central office calls on the circuits 72 and 73 and of interconnecting central office calls on the two circuits for conferencing purposes upon receipt of suitable hook flash commands from the sets 10. If, for example, a user is in the course of a central office call on the CO circuit 72 and he desires to place that call on hold, he simply generates one hook flash. Since relays K1 and A1 are already energized because the user is off hook, they are momentarily de-energized during the hook flash. The timing unit 90, in response to the momentary de-energization of the A1 relay, energizes relay C1. Relay C1, through its make contact 93, connects the circuit 72 to a hold coil 94 which serves to hold the call.

If the user generates a second hook flash, the timing unit 90 will respond to the second de-energization of the A1 relay and energize relay E1. Relay E1, through its make contact 98, connects the circuit 72 through condenser 99 to one of the windings of a transformer 101. This prepares the circuit 72 for a conferencing connection to the circuit 73. The conference connection between the two circuits is completed when a second user talking on the circuit 73 completes the connection as described below. The relay E1 remains energized until all sets 10 on the circuit 82 are returned to on an hook condition.

As previously noted, the circuit 83 is normally maintained in an intercom mode and any user on the circuit 83 who desires to be connected to the circuit 73 to place or receive a central office call must generate a hook flash command to do so. If the user on the circuit 83 generates a second hook flash, the second momentary de-energization of the relay A2 causes the timing unit 92 to energize relay E2 which, in turn, closes to make contact 102. The circuit 73 is then connected through the make contact 85 of relay C2 (which was previously closed by the first hook flash) and the make contact 102 to a hold coil 104. The second hook flash thus serves to place the central office call on the circuit 73 in a hold condition.

As shown in FIG. 5, relay E2 has a second make contact 105 which closes in response to the second hook flash. The closing the make contact 105 connects the circuit 73 through the closed make contact 85 of relay C2, a condensor 106 to the opposite winding of the transformer 101. Thus, if a user connected to the circuit 82 had, as described above, previously prepared his corresponding C0 circuit 72 for a conference call by two successive hook flashes, the user connected to the circuit 83 will complete the conference connection by his second hook flash. Otherwise, the second hook flash by the user on the circuit 83 simply places his call on hold.

Obviously, the user on the circuit 82 can be the one who completes the conference connection through transformer 101 if the user on the circuit 83 had previously established the connection of his circuit 73 to the transformer 101. As shown in FIG. 5, the timing units 90 and 92 are interconnected by a circuit 108, the function of which will be described more fully below in connection with FIG. 6.

The following summarizes the above described operation of the switching control unit 75:

| Action | Effect Circuit 82 | Circuit 83 |
|---|---|---|
| Lift handset (no hook flash) | connected directly to CO circuit 72 | connected for intercom use |
| One hook flash on circuit 82 | places CO call on hold | — |
| Two hook flashes on circuit 82 | prepare CO call for conference connection | — |
| One hook flash on circuit 83 | — | connects to CO circuit 73 |
| Two hook flashes on circuit 83 | — | places CO call on hold; prepares CO call for conference connection |

Figure 6:
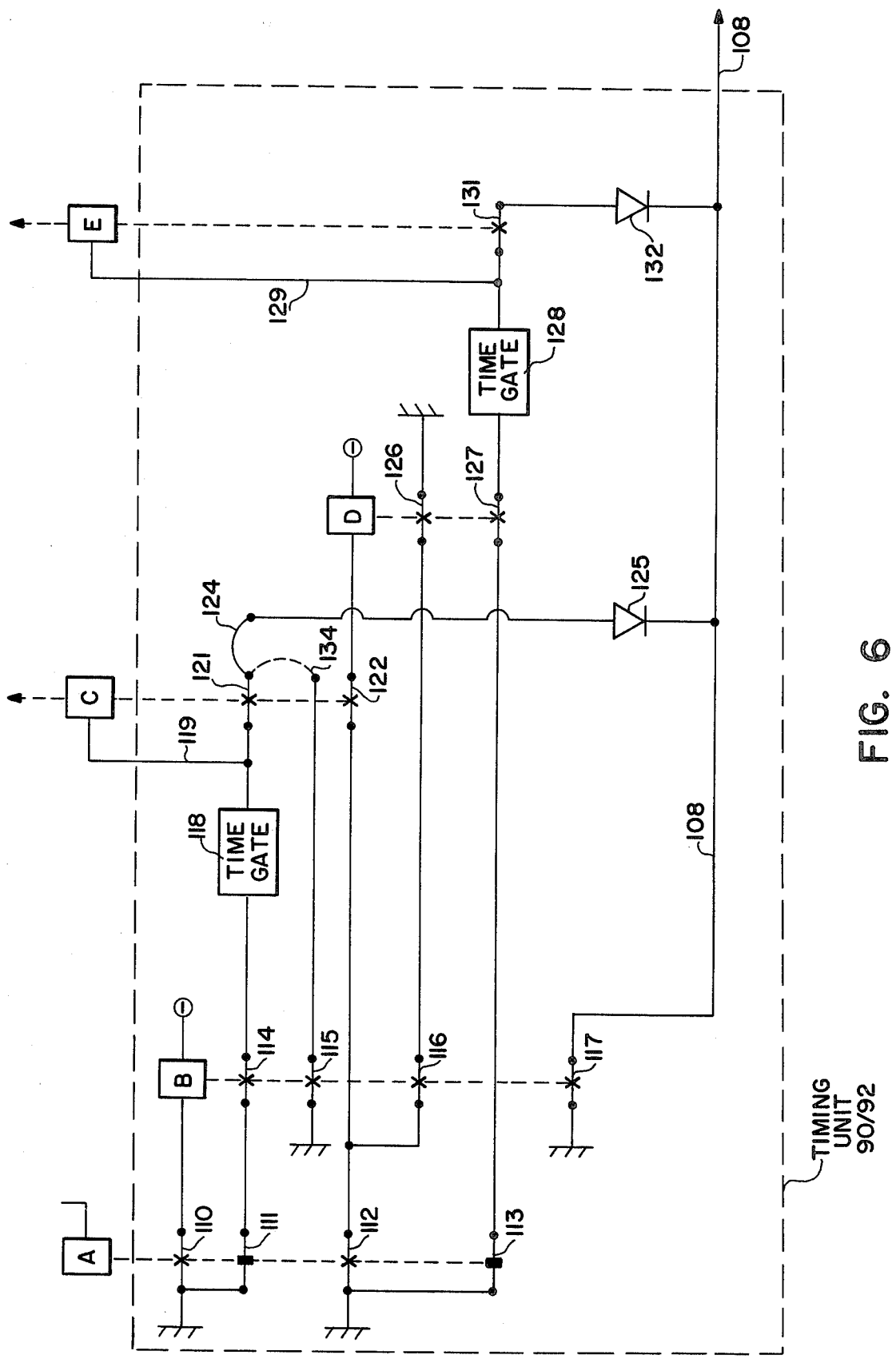
FIG. 6 illustrates in greater detail a timing control unit that is used in the modified system of FIG. 5.

FIG. 6 illustrates further details of the timing units 90 and 92 of FIG. 5. Since both units 90 and 92 are illustratively of substantially identical construction, only a single representative unit is shown in FIG. 6. The relays A, C and E in FIG. 6 correspond to the relays A1, C1 and E1, respectively, in the case of unit 90 and to the relays A2, C2 and E2, respectively, in the case of unit 92.

In FIG. 6, the A relay controls make contacts 110 and 112 and break contacts 111 and 113. The A relay is energized when one of the sets 10 connected to its corresponding timing unit 90 or 92 goes off-hook. The make contact 110 of relay A thereupon energizes slow acting relay B. Relay B, in turn, closes each of its make contacts 114, 115, 116 and 117. The relay B is selected to be slow acting so that it does not directly respond to on hook, off hook changes of short duration such as those in a hook flash or in dial pulses when dialing is being done. Thus, the relay B remains energized during these conditons even though the relay A may be affected thereby. As long as no hook flashes are received while the B relay is energized, no other relays in FIG. 6 are energized. The B relay is de-energized after the A relay is de-energized for a sufficiently long period of time, as when all associated sets 10 are returned to an on-hook condition.

If a hook flash is generated while the B relay is energized, the A relay will respond and release for the duration of the flash, but the B relay will not respond. The break contact 111 of A relay will momentarily close and momentarily apply a ground pulse through the make contact 114 of the B-relay to a time gate 118. If the duration of the flash is correct (e.g., greater than that of a dial pulse but less than about one second), the gate 118 will apply a ground pulse of limited duration over a line 119 to the C relay. The C relay is thus energized and closes its make contacts 121 and 122. A circuit path is thus established through the make contact 121, option strap 124, rectifier 125 to the circuit 108. The circuit 108 was previously grounded through the make contact 117 of the B relay. Thus, ground is maintained on the C relay and it remains energized. The C relay is de-energized when the B relay is de-energized (i.e., when the make contact 117 opens). This occurs when all associated set 10 have been replaced on-hook.

While the C-relay is energized, it also energizes, through its make contact 122 and the make contact 112 of the A relay, a second slow acting relay D. The D relay, in turn, closes its make contacts 126 and 127. The D relay remains energized because a ground circuit is established through its make contact 126, the make contact 116 of relay B and the make contact 122 of relay C. The D relay, through its make contact 127, prepares a second time gate 128 which is illustratively identical to the time gate 118. Thus, the time gate 128 is not placed on line until after the C relay is energized.

If a second hook flash is generated while the D relay is energized, the break contact 113 of the A relay will close momentarily to apply a ground pulse through make contact 127 to the time gate 128. If the flash is of the proper duration, the gate 128 will apply a ground pulse of limited duration over a line 129 to relay E. The E relay is thus energized and closes its make contact 131. The closing of make contact 131 establishes a ground circuit through rectifier 132, circuit 108 and make contact 117 of relay B. The E relay thus remains energized until the B relay is de-energized which occurs when all associates sets 10 are replaced on hook.

As suggested in FIG. 6 and shown in FIG. 5, the circuit 108 bridges and is common to both timing units 90 and 92. Thus, the circuit 108 will be grounded as long as the B relay in either one of the units 90 and 92 is energized. This means that the C and E relays, once energized, will remain energized as long as there is at least one set 10 that is off hook whether on the circuit 82 or the circuit 83. Thus, for example, a call placed on hold on the circuit 82 will not be lost even though all sets 10 connected to circuit 82 are replaced on hook as long as there is at least one set 10 connected to the circuit 83 that is off hook.

As an alternative, and particularly in the timing unit 92 associated with the circuit 83, the option strap 124 may be removed and replaced by option strap 134 which is shown as a dashed line in FIG. 6. With the latter arrangement, a ground circuit is provided from relay C through its make contact 121 and the make contact 115 of relay B. Thus, the C relay will release when the B relay in its associated timing unit 92 releases regardless of the fact that the B relay in the other timing unit 90 is still energized. Thus, with this option, when all sets 10 connected to the circuit 83 are replaced on hook or switched to the circuit 82, the relays A2, C2 and E2 will release to return the circuit 83 to an idle condition, making the circuit 83 independent of the circuit 82.

It should be understood that the foregoing detailed description is intended to illustrate rather than limit the principles of the invention and that numerous modifications may be made to the described embodiments without departing from the scope of the invention as defined by the appended claims. For example, it may be desirable to interpose a switchable attenuation network between the incoming call detector/signal generator 84 and the AC impedance 89 in FIG. 5. A make contact of the A2 relay, such as the make contact 110 in FIG. 6, may then be used to switch the attenuation network into and out of the circuit. Thus, if an incoming central office call comes in on the circuit 73 while the circuit 83 is being used for an intercom call, the A2 relay, because it is energized, switches the attenuation network on line and the network attenuates the incoming call signal so that its recognizable but not overly disturbing to those using the circuit 83. When, however, the circuit 83 is idle and the A2 relay is de-energized, the attenuation network is disconnected and the incoming call signal is passed to the circuit 83 at full level.

Additionally, it may be desirable to modify the timing unit 92 to include a third time gate which controls an additional relay G2 (not shown). The relay G2, rather than the E2 relay, may then be used to close the make contact 105 of FIG. 5 to complete a conference connection to the transformer 101. If this is done, then the first hook flash on the circuit 83 switches the circuit from an intercom mode to a central office call mode, the second hook flash places the central office call on hold and a third hook flash, to which the third or added time gate and relay G2 respond, establishes the conference connection. This modification thus separates the hold function from the conference function on the circuit 83.

It will also be appreciated that, when used in the embodiment of FIG. 5, the sets 10 of FIG. 1 may, but need not necessarily, include the hold circuit 18 and hold switch 19.

It thus is the object of the appended claims to cover these and other modifications as come within the true scope of the invention.

What I claim as new and desire to secure by Letters Patent of the United States is:

1. In a subscriber telephone system of the type including a first electrical circuit comprising a pair of conductors on the subscriber's premises connectable to each of a plurality of telephone sets on the premises, each of the telephone sets including a dial circuit for transmitting dial pulse signals over the first circuit and a talk circuit for transmitting and receiving voice signals over the first circuit, the first circuit being connected to a telephone company line extending from a central office for carrying central office calls to and from the subscriber's premises, apparatus for enabling at least two of the telephone sets on the premises to be used for intercom calls as well as central office calls, said apparatus comprising:

A. a second electrical circuit for carrying intercom calls comprising a pair of conductors on the premises connectable to each of the telephone sets to be used for intercom and central office calls;

B. means at the premises for supplying power to said second circuit to enable the transmission of voice signals thereover;

C. line selection means associated with each of the telephone sets to be used for intercom and central office calls for switching the talk circuit therein between the first circuit and said second circuit;

D. intercom signalling means separate from said dial circuit associated with each of the telephone sets to be used for intercom and central office calls and connectable to said second circuit, said intercom signalling means including an intercom call alerting signal generator for generating an intercom call alerting signal in an audio frequency range and at a level substantially above that of the voice signals transmitted over said second circuit and an intercom switch for activating said intercom call alerting signal generator to transmit the intercom call alerting signal over said second circuit; and E. intercom signal detecting means associated with each of the telephone sets to be used for intercom and central office calls and connectable to said second circuit, each of said intercom signal detecting means including means responsive to the presence of the audio frequency intercom call alerting signal on said second circuit for providing provide an indication that an intercom call is desired and threshold means for selectively attenuating the relatively low level voice signals on said second circuit in advance of said indication providing means.

2. Apparatus as recited in claim 1 in which the subscriber telephone system includes two or more four socket receptacles on the premises, the first circuit comprises two conductors connected to two of the four sockets in each of the receptacles, and each of the telephone sets includes a four prong plug adapted to be removably inserted in one of the receptacles for connection to the first circuit, said second circuit comprising two conductors connected to the remaining two of the four sockets in each of the receptacles, the sets thereby being connected to said second circuit when the plugs are inserted in the receptacles.

3. Apparatus as recited in claim 1 in which said indication providing means in each of said intercom signal detecting means comprises a loudspeaker which provides an audio indication in response to the presence of the intercom call alerting signal on said second circuit.

4. Apparatus as recited in claim 3 in which said intercom call alerting signal generator includes an oscillator for generating the audio frequency intercom call alerting signal, said oscillator being connectable to and powered by said second circuit through the closing of said intercom switch.

5. Apparatus as recited in claim 4 further including a diode bridge interposed between said second circuit and said oscillator for enabling operation of said oscillator independent of the polarity of said second circuit.

6. Apparatus as recited in claim 1 in which said power supplying means comprises a DC power supply and an AC impedance, said DC power supply being connected through said AC impedance to said second circuit.

7. Apparatus as recited in claim 1 in which there are first and second separate telephone company lines extending from the central office to the subscriber's premises for carrying central office calls to and from the subscriber's premises, the first circuit being connected to the first telephone company line, said apparatus further including F. means responsive to a command signal transmitted over said second circuit through the use of one of the telephone sets connected thereto for switching said second circuit from a connection with said power supply means to a connection with the second telephone company line to enable the transmission of voice signals thereover to and from the central office, said second circuit thereby being usable both for intercom calls and for calls to and from the central office.

8. Apparatus as recited in claim 7 in which the subscriber telephone system includes two or more four socket receptacles on the premises and each of the telephone sets includes a four prong plug adapted to be removably inserted in one of the receptacles, the first circuit comprising two conductors connected to two of the four sockets in each of the receptacles, and said second circuit comprising two conductors connected to the remaining two of the four sockets in each of the receptacles, the telephone sets thereby being connected to said first and second circuits when the plugs are inserted in the receptacles.

9. Apparatus as recited in claim 7 in which each of the telephone sets includes a hook switch and in which said command signal to which said second circuit switching means is responsive comprises a momentary closing of the hook switch in one of the telephone sets connected to said second circuit.

10. Apparatus as recited in claim 9 further including means for holding central office calls on the second telephone company line, said holding means being responsive to a second momentary closing of the hook switch in one of the telephone sets connected to said second circuit.

11. Apparatus as recited in claim 9 further including means for holding central office calls on the first telephone company line, said holding means being responsive to a momentary closing of the hook switch in one of the telephone sets connected to the first 12. Apparatus as recited in claim 11 further including means for enabling a conference connection between the first telephone company line and the second telephone company line, said conference enabling means being responsive to a subsequent momentary closing of the hook switch in one of the telephone sets connected to the first circuit.

13. Apparatus as recited in claim 9 further including means for enabling a conference connection between the second telephone company line and the first telephone company line, said conference enabling means being responsive to a subsequent momentary closing of the hook switch in one of the telephone sets connected to said second circuit.

14. Apparatus as recited in claim 7 further includng

G. means for detecting the presence of an incoming call from the central office on the second telephone company line and means responsive to said incoming call detecting means for transmitting an incoming call signal over said second circuit to said intercom signalling means in the telephone sets to provide an indication at the sets of the presence of the incoming call.

* * * * *